Robert P. Alger
INVENTOR.

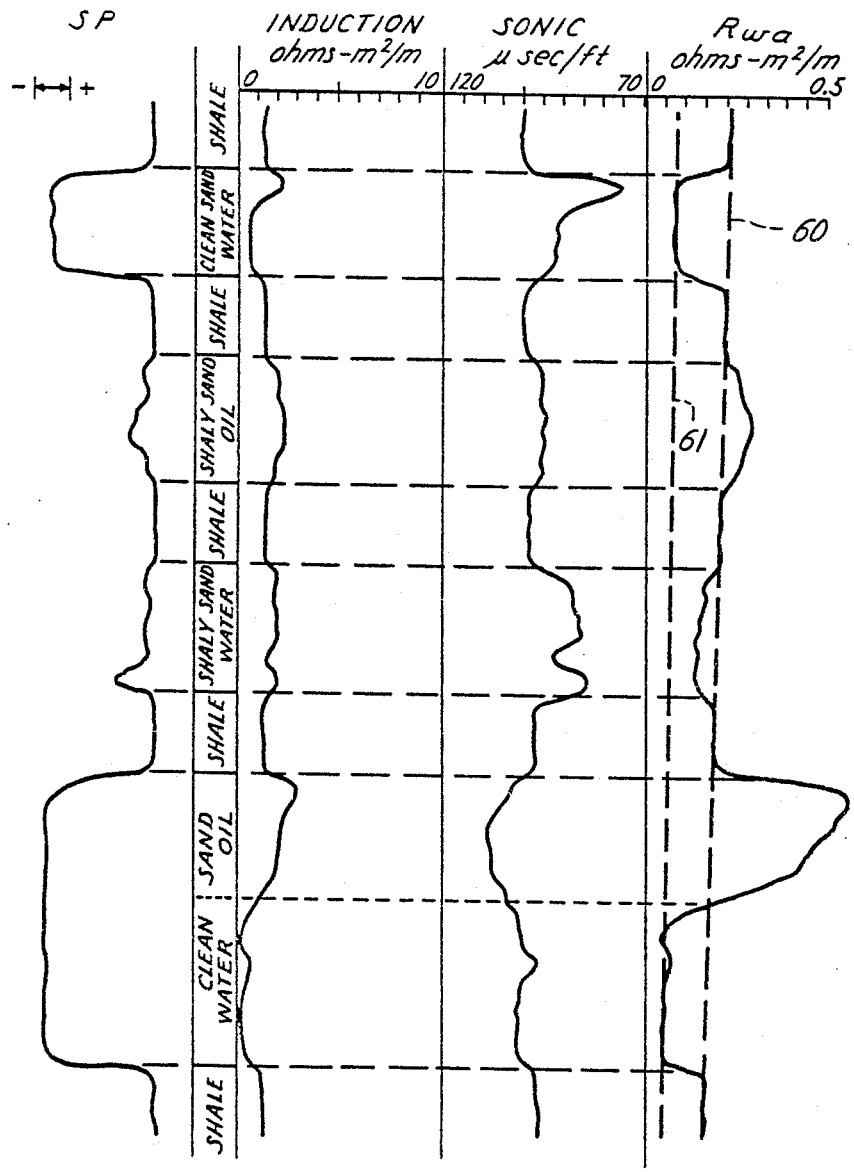

United States Patent Office 3,180,141
Patented Apr. 27, 1965

3,180,141
METHODS OF INVESTIGATING EARTH FORMATIONS UTILIZING RESISTIVITY AND POROSITY INDICATIONS
Robert P. Alger, Houston, Tex., assignor to Schlumberger Well Surveying Corporation, Houston, Tex., a corporation of Texas
Filed Sept. 9, 1960, Ser. No. 54,932
10 Claims. (Cl. 73—152)

This invention relates to the investigation of earth formations traversed by a borehole and more particularly to new and useful methods for investigating such formations to determine the presence of hydrocarbon-bearing zones.

Many techniques and apparatus have been developed for the in situ investigation of earth formations penetrated by boreholes to determine the presence of hydrocarbon-bearing zones and the possibility of obtaining hydrocarbon production from those zones. Of particular importance are various electrically operated apparatus which may be lowered into a borehole by means of a cable. Typically, an electromagnetic or acoustical signal is transmitted from the apparatus into the adjacent earth formations as a traverse of the borehole is made; and the return, or measure, signal is conducted or transmitted to the surface for recording so that a continuous log of the measured paramete versus depth is obtained.

The interpretation of these logs is extremely complicated due to the complexity of the formations themselves and the large number of variables entering into the measurements made. Also, many of the techniques require the use of values derived from the measurement of samples obtained from the formations or borehole or even from nearby wells. For example, the resistivity $R_w$ of the connate waters present in the formations is usually necessary in order to secure an accurate interpretation. This value may be found by actual measurement of a sample obtained on a drill-stem test or otherwise and then correcting the measurement for the temperature of the connate waters within the formations. This, in turn, requires at least a rough knowledge or estimate of the formation temperature at the various levels of interest. $R_w$ may also be determined from the spontaneous potential log in thick, shale-free formations if the drilling mud filtrate resistivity $R_{mf}$ and the formation temperature are known. $R_{mf}$ may be found by securing a sample of the drilling mud, separating the filtrate from the solid particles, then actually measuring the resistivity of the filtrate thus obtained and correcting the measured value for formation temperature. Obviously, there is ample opportunity for the introduction of errors in all of the above procedures.

Furthermore, log interpretation is often laborious and time consuming. For this reason, field personnel generally prefer to send the logs to the office of an expert where charts, correction curves and other equipment are available. Thus, the information contained in the logs is not immediately available in the field where it is needed to determine the course of further drilling or testing procedures. Also, an immediate interpretation might point up the need for other information which could be obtained from additional logs or side-wall samples.

Even where there is no need for immediate field evaluation, the time and effort required by conventional interpretation techniques often forbid a point-by-point analysis over long borehole sections. Generally, the interpretation expert relies on past experience in a particular area and a rapid scanning of the logs to determine the zones of potential interest. It is suspected that, for these reasons, many potentially productive zones may be overlooked, especially zones which are shaly or which have unusually high porosity.

Accordingly, it is an object of the invention to provide new and improved methods for locating hydrocarbon-bearing zones by correlating measurements of formation resistivity and porosity obtained as a function of depth.

Another object of the invention is to provide such methods of sufficient simplicity that rapid and reliable evaluation may be made in the field.

A further object of the invention is to provide such methods of sufficient simplicity that reliable evaluation of the presence of hydrocarbon-bearing zones may be made efficiently for many borehole intervals.

A still further object of the invention is to provide such methods that are readily adaptable to simple electronic computation so that information obtained directly from several borehole apparatus may be electronically combined to secure an easily interpretable indication of the presence of hydrocarbon-bearing zones.

In accordance with the invention, these and other objects are attained by the method of measuring and obtaining indications of the true formation resistivity and the formation porosity at successive depths in the borehole and combining these indications in accordance with a mathematical relation giving an apparent connate water resistivity having values representative of the actual connate water resistivity for water-bearing zones and anomalous values for hydrocarbon-bearing zones. The extent of anomalous values can be discovered readily by comparison with actual values of $R_w$ for nearby water-bearing zones or by comparison with apparent values of $R_w$ for pure shales. The applicability of the method to various type of rock structures is subject only to the limitations of the devices used to measure true resistivity and porosity.

For most rock structures and drilling conditions, it is preferred to measure the true formation resistivity with a focused induction logging device of the type disclosed in Patent Nos. 2,582,314 for "Electromagnetic Well Logging System" and 2,788,483 for "Phase Rejection Network," issued January 15, 1952 and April 9, 1957, respectively, to Henri-Georges Doll. Such induction logging devices investigate a portion of the formation sufficiently removed from the borehole so that the indications obtained are practically unaffected by the borehole fluid, invasion and bed thickness, except for very deeply invaded zones and for very thin beds. For very thin beds or where very salty drilling muds are used, a focused current device using current emitting and potential measuring electrodes (such as described in Patent No. 2,712,628 for "Electrical Logging Apparatus," issued July 5, 1955 to Henri-Georges Doll or as described in co-pending application Serial No. 759,743, filed September 8, 1958, now U.S. Patent No. 3,031,612, issued April 24, 1962, by Mahlon F. Easterling) may be employed. For deriving measurements of porosity, it is preferred to utilize an acoustic velocity or sonic logging device of the type disclosed in co-pending application Serial No. 745,548, filed June 30, 1958 by Frank P. Kokesh. Such acoustic logging apparatus is also disclosed in Patent No. 2,938,592 for "Seismic Velocity Logging Apparatus," issued May 31, 1960 to C. J. Charske et al.

The method is particularly adaptable to electronic computation since the only measured variables necessary to its practice are the true resistivity and porosity. Where these variables may be measured simultaneously, a simple electronic computer may be used to solve the mathematical relation and provide a continuous recordable signal representative of the apparent connate water resistivity. This signal may be recorded separately or on the same chart with the true resistivity and porosity signals to provide an immediately usable log for evaluation of the productive potential of the formations. Where simultaneous measurement is not possible, the true resistivity and porosity signals may be recorded separately on magnetic tape, for example, and then processed through the computing apparatus.

For automatic computation. it is preferred to utilize true resistivity and porosity measuring devices which have roughly the same vertical resolution, that is, the volume of formation contributing to the true resistivity and porosity signals at any one instant should have substantially the same vertical dimensions.

The invention may best be understood, and further objects and advantages will become apparent, from the following description and the accompanying drawings in which:

FIG. 3 is an illustration of a typical log showing the recorded values of true resistivity, porosity and apparent connate water resistivity.

Figure 1:
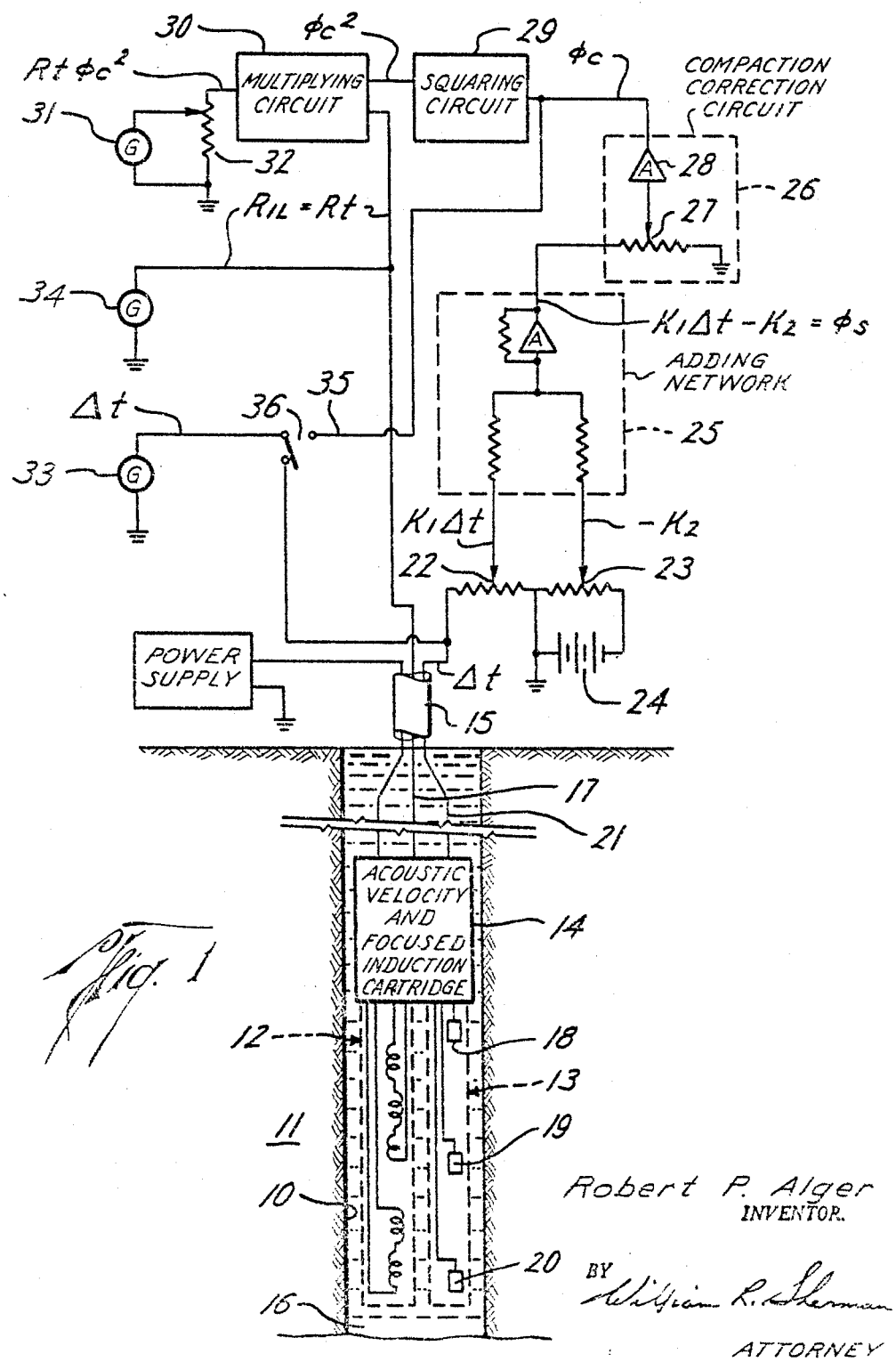
FIG. 1 is a diagrammatic illustration of a system for electronically practicing the invention.

To assist in understanding the invention, reference will first be made to some of the fundamentals of resistivity measurements and interpretation techniques.

The matrix materials of earth formations are, for the most part, electrically non-conductive; and a path of electrical current is provided only by the mineralized connate waters contained in the pore spaces within the materials. Therefore, the electrical resistivity of a formation depends primarily upon three variables:

(1) Formation porosity, i.e., the fraction of the total volume of a formation sample which is occupied by pore spaces;
(2) The resistivity of the connate water; and
(3) The water saturation, i.e., the fraction of the pore space occupied by the connate water.

It may be said, generally, that, where the water saturation is less than unity, the remainder of the pore space is occupied by electrically non-conductive hydrocarbons.

It is known that these variables may be related by the expression $$R_t = \frac{aR_w}{\phi^m S_w^n} \qquad (1)$$

where $R_t$ is the true formation resistivity;
$a$ is a constant dependent upon the rock structure ($a=.81$ may be used for most sands, $a=1.0$ for most carbonates);
$R_w$ is the connate water resistivity;
$\phi$ is the formation porosity;
$m$ is an exponent dependent upon the rock structure ($m=2$ may be used for most formations);
$S_w$ is the water saturation; and
$n$ is an exponent dependent upon the rock structure ($n=2$ may be used for most formations).

Expression (1) forms the basis for most interpretation techniques; but, as previously mentioned, the procedures are too involved to permit fast interpretation in the field or efficient evaluation of numerous intervals throughout the borehole. Even where $\phi$ and $R_t$ are directly measurable, $S_w$ cannot be accurately determined without an accurate value of $R_w$, which may vary from formation to formation and always varies with temperature.

In accordance with the invention, a method is provided whereby all variables are practically eliminated from expression (1) except $\phi$ and $R_t$. The method may be understood by reference to the following brief analysis.

Expression (1) may be rewritten (using the normal values assigned to constants $a$, $m$ and $n$) as $$R_w = \frac{R_t \phi^2}{.81} \cdot S_w^2 \qquad (2)$$

For a sand 100% saturated with connate water, the term $S_w^2$ will be equal to one; but for a sand containing hydrocarbons the term will have a value less than one determined by the proportion of hydrocarbons present. However, if it is assumed that all sands are 100% water saturated, expression (2) may be written as $$R_{wa} = \frac{R_t \phi^2}{.81} \qquad (3)$$

where $R_{wa}$ is an apparent connate water resistivity which will be higher than $R_w$ by the factor $$\frac{1}{S_w^2}$$

If a systematic computation of $R_{wa}$ is made throughout the borehole using values of $R_t$ obtained from a true resistivity log and values of $\phi$ derived from an acoustic velocity log, the computed $R_{wa}$ values obtained for water-saturated reservoirs will be very close to the true $R_w$. But, for hydrocarbon-saturated reservoirs, the value of $R_{wa}$ will be too high because of the incorrect assumption that $S_w^2$ is equal to one.

In a typical borehole, there will be found a series of potentially productive formations, most of them water-bearing, separated by intervals of shale or other impermeable rocks. By computing $R_{wa}$ over a long series of potentially productive zones, a trend, or base, value of apparent connate water resistivity can be discerned. Where the water-bearing sands are relatively shale-free, this trend value should be very close to the true connate water resistivity. Generally, the trend will be toward a gradual decrease in $R_{wa}$ with depth as the formation temperatures and salinities increase. When the computed $R_{wa}$ for any zone is appreciably higher than the established trend, the presence of hydrocarbons may be suspected; and the greater the departure from the trend value, the greater is the likelihood that hydrocarbons may be present.

The nature of the connate waters and their resistivity characteristics can vary remarkably with geographic location, depth, and geological age; but a definite trend will usually be found in any one borehole. And even though abrupt changes in connate water characteristics may exist between particular sections within a borehole, there will usually be a sufficient number of water sands within each section to establish a trend value.

Where it is impossible to establish a true $R_w$ trend or base line because of the absence of a sufficient number of clean, water-bearing sands, then a base line may be established using $R_{wa}$ values computed for pure shales. This pure shale trend line will usually show $R_{wa}$ values several times larger than the true $R_w$. However, a water-bearing sand (clean or shaly) will typically show an $R_{wa}$ much less than the pure shale trend value, a hydrocarbon-bearing, clean sand will typically show an $R_{wa}$ much greater than the pure shale trend value, and a hydrocarbon-bearing shaly sand will typically show an $R_{wa}$ equal to or greater than the pure shale trend value. For the case of a hydrocarbon-bearing shaly sand which shows an $R_{wa}$ value of the same order of magnitude as the pure shale $R_{wa}$, reference may be made to a spontaneous potential log or other permeability indicator to distinguish the shaly sand from the pure shale.

It is preferred to use the acoustic velocity, or sonic, log for the measurement of porosity, since correction charts are not required in order to derive a usable value of porosity from the signal obtained. Normally, in order to obtain true porosity, the sonic signal must be corrected for shaliness, for the presence of hydrocarbons, for the presence of highly saline connate waters, and for compaction in the case of unconsolidated formations. But for use in practicing the present invention, only the compaction correction is necessary. In the case of shaliness, the uncorrected sonic signal will give a porosity that is too high; but, where the shaly sand also contains hydrocarbons, this error will be minimized by the fact that $R_t$ is too low. For water-bearing shaly sand, the computed $R_{wa}$ will be higher than $R_w$ but not as high as if the sand contained hydrocarbons. In the case of hydrocarbon saturation, the uncorrected sonic signal tends to give a porosity that is too high, but this is advantageous, since it serves to further exaggerate the $R_{wa}$ anomaly. In the case of highly saline conate waters, the uncorrected sonic signal gives a porosity that is slightly too low and, therefore, an $R_{wa}$ which is too low; but this again tends to exaggerate the $R_{wa}$ anomaly. The compaction correction, in the case of unconsolidated formations, is not strictly necessary, since hydrocarbon-bearing zones will still be evident. But such correction is preferred in order to obtain $R_{wa}$ values in clean water sands that are equal to the true $R_w$. These $R_w$ values and the $R_{wa}$ values obtained for hydrocarbon-bearing zones may then be used for quantitative interpretation in accordance with expression (1) and other known relations. The procedure for making the compaction correction will be described hereinafter with respect to the electronic computation system of FIG. 1.

Figure 2:
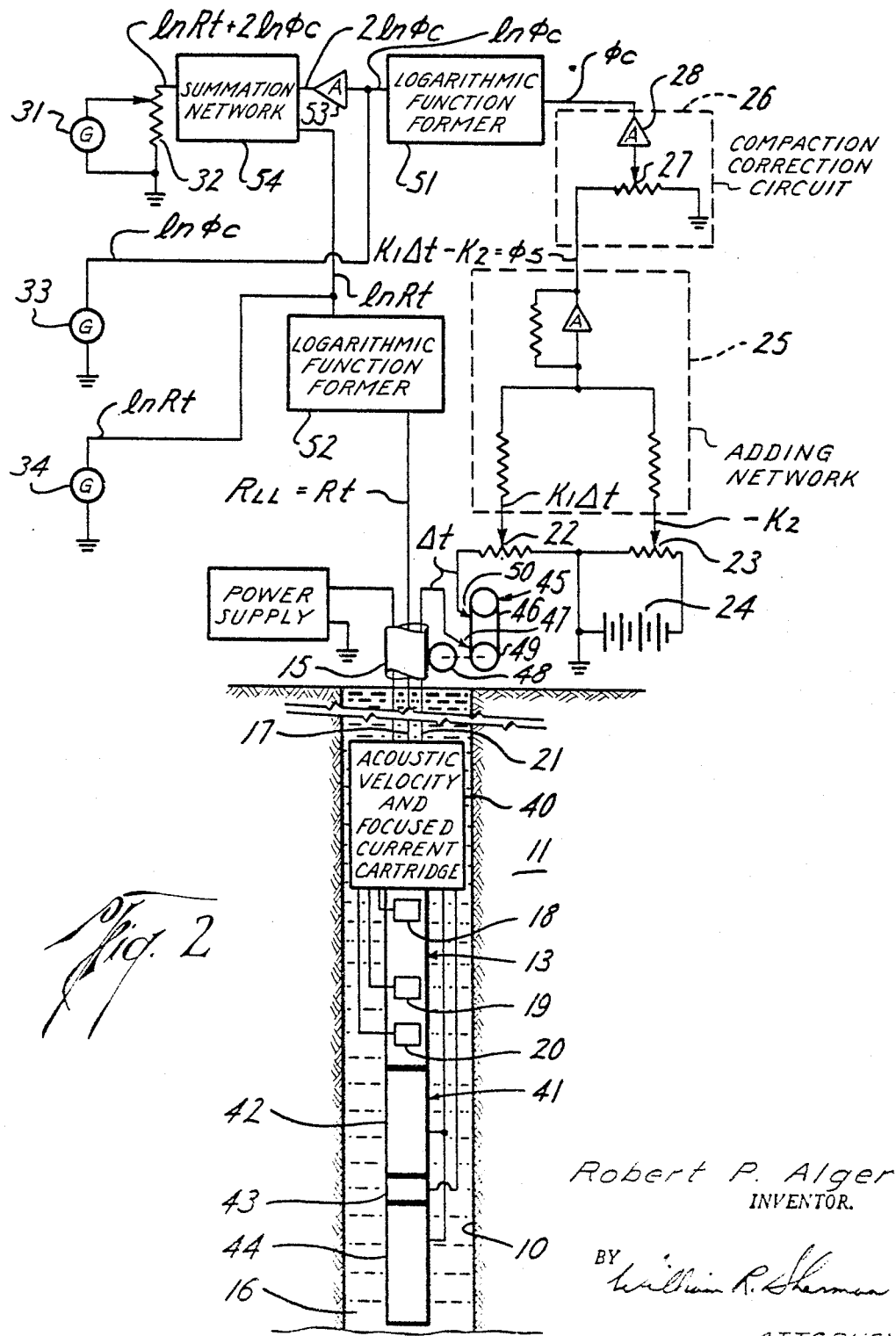
FIG. 2 is a diagrammatic illustration of an alternative system for electronically practicing the invention.

From the foregoing, it will be obvious that the invention can be practiced by hand computations utilizing expression (3) and values of $R_t$ and $\phi$ obtained or derived from the logs. However, it is contemplated that the method may be more efficiently practiced by the use of an automatic computer. In FIGS. 1 and 2, there are illustrated typical systems whereby the $R_t$ and $\phi$ measurements may be simultaneously obtained and processed through an electronic computing system to obtain $R_{wa}$. Where desirable or necessary, the $R_t$ and $\phi$ signals could be recorded separately on magnetic tape, for example, and later processed by synchronous playback through the computing apparatus.

Referring now to FIG. 1, there is illustrated in cross-section a borehole 10 drilled through earth formations 11. Borehole 10 is normally filled with a drilling fluid 16. A typical focused induction logging array 12, an acoustic velocity logging array 13 and a cartridge 14 are shown suspended in borehole 10 by means of a conventional multiconductor logging cable 15, by which the borehole apparatus may be raised and lowered in a customary manner.

For suitable details of the induction logging array 12 and its associated circuitry in cartridge 14, reference is made to the previously cited Patent Nos. 2,582,314 and 2,788,483 to Henri-Georges Doll. The coils of logging array 12 are arranged to derive a signal representative of the resistivity of a portion of the adjacent formation sufficiently removed from the borehole so that the indications obtained are practically unaffected by drilling fluid 16, invasion or bed thickness. This signal, which is representative of true formation resistivity $R_t$, is transmitted to the surface through cable conductor 17 for recording and computation.

For details of the acoustic velocity logging array 13 and its associated circuitry in cartridge 14, reference is made to the previously cited application Serial No. 745,548, filed June 30, 1958 by Frank P. Kokesh, and Patent No. 2,938,592 to C. J. Charske et al. Acoustic logging array 13 comprises an acoustic transmitter 18 and a pair of receivers 19 and 20. Transmitter 18 periodically emits acoustic pulses which are received successively by receivers 19 and 20. The difference $\Delta t$ in the times of arrival is detected by the circuitry in cartridge 14 and a corresponding signal is transmitted to the surface through cable conductor 21 for recording and computation. The $\Delta t$ signal represents the time required for the acoustic pulses to traverse a length of formation equal to the distance between receivers 19 and 20. It may be shown that $\Delta t$ is related to the porosity of the formation located adjacent to and between receivers 19 and 20 by the expression:

$$\phi_s = k_1 \Delta t - k_2 \quad (4)$$

where $\phi_s$ is the uncorrected formation porosity as given by the acoustic device, $$k_1 = \frac{V_f V_m}{V_m - V_f} \quad (5)$$

and $$k_2 = \frac{V_f}{V_m - V_f} \quad (6)$$

and where $V_m$ is the acoustic velocity in the matrix material of the formations, and $V_f$ is the acoustic velocity in the interstitial fluid within the matrix.

$V_m$ is known to vary from 18,000 to 23,000 ft./sec., depending upon geographic location and geological section; and a value of 5300 ft./sec. is normally used for $V_f$.

The spacings and placement of acoustic receivers 19 and 20 and the coils in induction logging array 12 are adjusted so that, at any particular instant, the $\Delta t$ and $R_t$ signals derived are representative of a section of formation located between the same vertical planes. Equal vertical resolution of the two devices is not required by the invention but is desirable from the standpoint of eliminating unnecessary details from the computed $R_{wa}$ log. This results from the fact that the $R_{wa}$ log is obtained by multiplying two signals. It will therefore be reliable only to the extent of the signal details of the device having the largest vertical resolution even though it will nevertheless exhibit the signal details of the device having the smallest vertical resolution.

Referring still to FIG. 1, the $\Delta t$ signal received at the surface is processed through the computer circuit to derive $\phi_s$ in the following manner. Adjustable $k_1$ potentiometer 22 may be set at the value determined by expression (5) for the particular well logged to provide an adding network 25 with a signal representing $K_1 \Delta t$. Adjustable $k_2$ potentiometer 23 connected across battery 24 may be set at the value determined by expression (6) to provide the adding network 25 with a signal representative of $-k_2$. In the adding network, which may comprise an operational amplifier connected as a summer, the signals are combined to give a resultant signal representative of $\phi_s$ in accordance with expression (4).

The compaction correction circuit 26 consists of adjustable potentiometer 27 and D.C. amplifier 28 arranged so that, at a central adjustment position of potentiometer 27, no gain correction is made to the $\phi_s$ signal. As previously mentioned, the compaction correction is necessary only in the case of unconsolidated formations. Sands are considered to be unconsolidated when the average transit time of the acoustic signal in the adjacent shales is less than 100 $\mu$sec/ft. The correction is a simple linear one and the following empirical expression has been found to give a good approximation:

$$\phi_c = \phi_s \frac{100}{\Delta t_{sh} \cdot c} \quad (7)$$

where $\phi_c$ is the corrected porosity, $\phi_s$ is the uncorrected porosity derived from the acoustic signal, $\Delta t_{sh}$ is the average transit time of the acoustic signal in the adjacent shales, and $c$ is a constant which generally varies from .8 to 1.2 depending upon the geographic location and the particular geological section.

The value of $\Delta t_{sh}$ may be determined from acoustic velocity logs previously run on nearby wells or may be actually measured in the borehole under investigation prior to commencement of the logging operation. The desired correction according to expression (7) may then be made by adjustment of potentiometer 27 to give an output signal from compaction correction circuit 26 representative of $\phi_c$.

A squaring circuit 29, which may, for example, be a diode function former, converts the $\phi_c$ signal to a value representative of $\phi_c^2$. This signal is then processed with the $R_t$ signal from the induction logging device through a multiplying circuit 30, which has an output representative of $R_t \phi_c^2$. This output is representative of $R_{wa}$ in accordance with expression (3), except for the factor ".81." This factor may be introduced into the input of recording galvanometer 31 as a simple scale adjustment utilizing potentiometer 32.

The $R_t$ and $\Delta t$ signals are also separately tapped to recording galvanometers 33 and 34, respectively. Alternatively, $\phi_c$ rather than $\Delta t$ may be recorded by galvanometer 34, as shown by connection 35, when switch 36 is thrown. Galvanometers 31, 33 and 34 may be mounted in a conventional multi-channel galvanometric recorder of the type commonly employed in well logging so that a continuous record of the $R_{wa}$, $R_t$ and $\Delta t$ signals versus borehole depth may be obtained, as illustrated in FIG. 3.

In FIG. 2, there is illustrated an alternative system for practicing the invention. The system utilizes a focused current electrode device 41 rather than the focused induction device 12 of FIG. 1. For suitable details of the focused current device 41 and its associated circuitry in cartridge 40, reference is made to the previously cited Patent No. 2,712,628 to Doll and the cited application Serial No. 759,743 by Easterling. The electrodes 42, 43 and 44 of device 41 and the associated circuitry in cartridge 40 are arranged so that a surveying current is constrained to flow from electrode 43 into the formations within a horizontal disc of limited vertical thickness when suitable potentials are applied to focusing electrodes 42 and 44, as well as main electrode 43. The measure signal potential $R_{LL}$ between electrode 43 and ground then represents $R_t$. Thus, the device is well adapted to investigate true formation resistivity $R_t$ for very thin beds or where the borehole fluid 16 is very salty. The acoustic velocity logging array 13 and its associated circuitry in cartridge 40 may be of the same type described in connection with FIG. 1. However, it may be desirable to use a shorter spacing for receivers 19 and 20 so that the vertical resolution of the acoustic device 13 matches that of the focused current device 41.

As illustrated in FIG. 2, the acoustic device 13 and the focused current device 41 are not arranged at the same level within the borehole. Therefore, the signals derived at any one instant of time do not represent the same vertical section of formation. In order to record the signals so that they are not displaced with respect to depth on the log and to provide the computer circuits with signals representative of the same formation, it is necessary to delay one of the signals for a period of time that will be related to the logging speed. Where the borehole is to be logged from bottom to top, the $\Delta t$ signal must be so delayed. Apparatus for performing this function is known in the well logging art and is illustrated schematically at 45. The $\Delta t$ signal on cable conductor 21 is recorded on a moving magnetic tape 46 by means of a recording head 47. The movement of tape 46 is synchronized with the logging speed by means of a measuring wheel 48 driven by cable 15 and mechanically coupled to a tape capstan 49. A magnetic pick-up 50 is displaced a fixed distance from recording head 47 along the tape 46. Thus, the $\Delta t$ signal will be delayed for a period of time equal to the time required for the borehole apparatus to move a distance equal to the spacing between the acoustic velocity device measure point and the focused current device measure point at whatever logging speed is used.

The processing of the $\Delta t$ signal in the computer circuits is the same as that illustrated in FIG. 1 up to the logarithmic function former 51. This circuit converts the $\phi_c$ signal to a signal representative of ln $\phi_c$. Amplifier 53 further processes the signal to represent the logarithmic function of $\phi_c^2$, i.e., 2 ln $\phi_c$.

The signal $R_{LL}$ (equal to $R_t$), which is transmitted to the surface through cable conductor 17, is similarly processed through logarithmic function former 52 into a signal representative of ln $R_t$. Summation network 54 adds the transformed signals to derive a final signal representative of the logarithmic function of expression (3), except for the factor ".81." This factor may be introduced into the input of recording galvanometer 31 in the same manner as described for FIG. 1. The galvanometers may be adapted, as in FIG. 1, for recording a continuous record versus borehole depth. Thus, there is obtained a continuous record of a logarithmic function of $R_{wa}$, $R_t$ and $\phi_c$ (or $\Delta t$). The logarithmic scale obtained is preferred for particular borehole conditions, e.g., where hard rocks or limestones are present or where the range of resistivity values is wide.

In FIG. 3, there is illustrated a typical log which may be obtained with the FIG. 1 system. The four curves, shown from left to right, are the conventional spontaneous potential log (SP), the true resistivity log (INDUCTION), the acoustic velocity log scaled in units of $\Delta t$ (SONIC), and the computed apparent connate water resistivity log ($R_{wa}$). The depth scale, which is normally shown in the vertical column between the SP and INDUCTION curves, has been omitted and replaced with descriptions of the types of formations and their fluid contents.

The primary value of the SP curve is to aid in distinguishing permeable and impermeable zones. It may be logged separately with other conventional apparatus or simultaneously with the induction and sonic curves by adding simple, known apparatus to the FIG. 1 system.

Dotted line 61 has been drawn through the $R_{wa}$ values corresponding to clean water-bearing sands to indicate the actual $R_w$ base or trend line established by those values. The anomalous $R_{wa}$ values corresponding to the clean oil sand clearly illustrates the efficacy of the method to distinguish the clean oil and water zones.

Dotted line 60 has been drawn through the $R_{wa}$ values corresponding to clean shales to indicate the pure shale base or trend line which may be used for distinguishing water-bearing and hydrocarbon-bearing shaly sands, or which may be used as a general trend line where the clean water sand line 61 is not apparent. Trend lines 60 and 61 clearly illustrate the utility of the method to derive a rapid evaluation of the productive potential of both clean and shaly sands. Shaly water-bearing sands will typically show $R_{wa}$ values higher values higher than the clean water sand trend line 61 but lower than the pure shale trend line 60, whereas shaly hydrocarbon-bearing sands will show $R_{wa}$ values higher than both trend lines or at least equal to trend line 60.

It is apparent that modifications may be made without departing from the spirit and scope of the invention. Accordingly, the invention is not to be limited, except as specified in the appended claims.

What is claimed is:

1. A method of investigating a subsurface earth formation traversed by a borehole comprising: obtaining an indication of the electrical resistivity of the formation; obtaining an indication of the porosity of the formation; and combining these indications to provide an indication of the mathematical product of the resistivity times a predetermined power of the porosity thereby to provide an indication of the character of the fluid contained in the formation.

2. A method of investigating a subsurface earth formation traversed by a borehole comprising: obtaining an indication of the electrical resistivity of the formation; obtaining an indication of the porosity of the formation; and generating a resultant indication $R_{wa}$ by combining the resistivity and porosity indications in accordance with the relationship $$R_{wa}=\frac{R_t\phi^m}{a}$$

where $R_t$ is the resistivity indication, $\phi$ is the porosity indication, and "$m$" and "$a$" are constants which are determined by the general type of rock structure being investigated.

3. A method of investigating subsurface earth formations traversed by a borehole comprising: obtaining indications of the electrical resistivity of the formations; obtaining indications of the porosity of the formations; combining these indications to generate resultant $R_{wa}$ indications in accordance with the mathematical relationship $$R_{wa}=\frac{R_t\phi^m}{a}$$

where $R_t$ is the resistivity indication, $\phi$ is the porosity indication, and "$m$" and "$a$" are constants which are determined by the general type of rock structure being investigated; and recording the resultant $R_{wa}$ indications as a function of borehole depth.

4. A method of investigating subsurface earth formations traversed by a borehole comprising: moving an electrical exploring system through the borehole; obtaining indications of the electrical exploring system response to the electrical resistivity of the formations; generating the first electrical signals which vary as a function of the resistivity indications; moving an acoustic exploring system through the borehole; obtaining indications of the acoustic exploring response to the porosity of the formations; generating second electrical signals which vary as a function of the porosity indications; generating third electrical signals which vary as a function of the product of the first and second electrical signals; and recording the third electrical signals as a function of borehole depth.

5. A method of investigating subsurface earth formations traversed by a borehole comprising: moving an electrical exploring system through the borehole; obtaining indications of the electrical exploring system response to the electrical resistivity of the formations; moving an acoustic exploring system through the borehole; obtaining indications of the acoustic exploring system response to the porosity of the formations; generating resultant $R_{wa}$ indications by combining these electrical and acoustic indications in accordance with the relationship $$R_{wa}=\frac{R_t\phi^m}{a}$$

where $R_t$ is the electrical indication, $\phi$ is the acoustic indication, and "$m$" and "$a$" are constants which are determined by the general type of rock structure being investigated; and recording the resultant $R_{wa}$ indications as a function of borehole depth.

6. A method of investigating subsurface earth formations traversed by a borehole comprising:
moving an electrical exploring system through the borehole;
obtaining indications of the electrical exploring system response to the electrical resistivity of the formations;
generating first electrical signals which are proportional to the resistivity indications;
moving an acoustic exploring system through the borehole;
obtaining indications of the acoustic exploring system response to the porosity of the formations;
generating second electrical signals which are proportional to the porosity indications;
generating third electrical signals which are proportional to a mathematical power of the second signals;
generating fourth electrical signals which are proportional to the product of the first and third electrical signals;
and recording the fourth electrical signals as a function of borehole depth.

7. A method of investigating subsurface earth formations traversed by a borehole comprising:
moving an electrical exploring system through the borehole;
obtaining indications of the electrical exploring system response to the electrical resistivity of the formations;
generating first electrical signals which are proportional to the logarithms of the resistivity indications;
moving an acoustic exploring system through the borehole;
obtaining indications of the acoustic exploring system response to the porosity of the formations;
generating second electrical signals which are proportional to the logarithms of the porosity indications;
generating third electrical signals which are proportional to the sums of the first and second electrical signals;
and recording the third electrical signals as a function of borehole depth.

8. A method of investigating a subsurface earth formation traversed by a borehole comprising:
generating a first signal proportional to the electrical resistivity of the formation;
generating a second signal proportional to the porosity of the formation;
generating a third signal which is proportional to a mathematical power of the second signal;
generating a fourth signal which is proportional to the product of the first and third signals;
and providing an indication of the fourth signal.

9. A method of investigating a subsurface earth formation traversed by a borehole comprising:
measuring the electrical resistivity of the formation;
generating a first electrical signal proportional to the measured resistivity;
measuring the porosity of the formation;
generating a second electrical signal proportional to the measured porosity;
generating a third electrical signal which is proportional to a mathematical power of the second signal;
generating a fourth electrical signal which is proportional to the product of the first and third signals;
and providing an indication of the fourth signal.

10. A method of investigating a subsurface earth formation traversed by a borehole comprising:
measuring the electrical resistivity of the formation;
generating a first electrical signal proportional to the logarithm of the measured resistivity;
measuring the porosity of the formation;
generating a second electrical signal proportional to the logarithm of the measured porosity;
generating a third electrical signal which is proportional to the sum of the first and second signals;
and providing an indication of the third signal.

References Cited by the Examiner
UNITED STATES PATENTS

| 2,395,617 | 2/46 | Doll | 324—1 |
| 2,669,689 | 2/54 | Doll | 324—1 |
| 2,712,627 | 7/55 | Doll | 324—1 |
| 2,713,147 | 7/55 | Stripling | 324—1 |
| 2,938,708 | 5/60 | Arps | 324—1 |

WALTER L. CARLSON, *Primary Examiner.*

JAMES W. LAWRENCE, SAMUEL BERNSTEIN,
*Examiners.*